(12) United States Patent
Narvarti et al.

(10) Patent No.: US 6,616,745 B1
(45) Date of Patent: Sep. 9, 2003

(54) BLACK PEARLESCENT PIGMENTS

(75) Inventors: Samuel F. Narvarti, Matamoras, PA (US); Mark E. Gall, South Euclid, OH (US); Thomas V. Edwards, Elyria, OH (US); Frank A. Mazzella, Rhinebeck, NY (US); William L. Howell, Jr., Wakeman, OH (US)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 10/196,281

(22) Filed: Jul. 17, 2002

(51) Int. Cl.⁷ ................................................ C04B 14/20
(52) U.S. Cl. ....................... 106/417; 106/415; 106/430; 106/436; 106/439; 106/441; 106/453
(58) Field of Search ................................ 106/415, 417, 106/430, 436, 441, 453

(56) References Cited

U.S. PATENT DOCUMENTS

| 3,087,828 A | 4/1963 | Linton |
| 3,087,829 A | 4/1963 | Linton |
| 3,711,308 A | 1/1973 | Brand et al. |
| 3,874,890 A | 4/1975 | Bernhard et al. |
| 4,146,403 A | 3/1979 | Armanini et al. |
| 4,886,100 A | 12/1989 | Parker, III |
| 5,137,575 A | 8/1992 | Yasuki et al. |

*Primary Examiner*—C. Melissa Koslow
*Assistant Examiner*—Shalie Manlove
(74) *Attorney, Agent, or Firm*—Dickstein, Shapiro, Morin & Oshinsky, LLP.

(57) ABSTRACT

A metal oxide-coated mica pearlescent pigment having a coating of copper chromite thereon is provided.

19 Claims, No Drawings

BLACK PEARLESCENT PIGMENTS

BACKGROUND OF THE INVENTION

Many pearlescent or nacreous pigments are based on the use of a laminar substrate such as mica which have been coated with a metal oxide layer. As a result of reflection and refraction of light, these pigments exhibit pearl-like luster and depending on the thickness of the metal oxide layer, they can also exhibit interference color effects. The pearlescent pigments encountered on a commercial basis are most often either titanium dioxide-coated mica or iron oxide-coated mica pearlescent pigments. Both types are well known in the art.

The overcoating of the titanium dioxide-coated or iron oxide-coated mica pearlescent pigment is also well known in the art. See, for example, U.S. Pat. Nos. 3,087,828, 3,087,829, 3,711,308, 3,874,890, 4,146,403, 4,886,100, and 5,137,575.

Copper chromite, also known as Pigment Black 28, is a black material. When it is coated in a sufficient quantity on a laminar or platy substrate such as mica, the coating is opaque. In contrast, pearlescent pigments are based on the fact that there is reflection at the surface of the coating and also a transmission through the coating to the next interface, and reflection at that next interface.

It has now been surprisingly discovered that if copper chromite is coated onto a metal oxide-coated, e.g. a titanium dioxide- or iron oxide-coated mica pearlescent pigment, there is color advancement of the interference color and an increase in the opacity of the pigment. It has also been found that if the layer is thick enough, the color progresses to the next shade and 100% opacity can be achieved at lower pigment loads.

It has also been found that copper chromite can be coated onto a platy substrate, e.g., mica, kaolin, etc., and then coated with a metal oxide layer which produces colored black pigments. The initial layer of copper chromite can be of sufficient quantity to be opaque (about 45% $CuCr_2O_4$ when the substrate is mica) or semitransparent.

It is therefore the object of this invention to provide new black pearlescent pigments. This and other objects of the invention will become apparent to those of ordinary skill in this art from the following detailed description.

SUMMARY OF THE INVENTION

This invention relates to black colored metal oxide pearlescent pigments and more particularly to iron oxide-coated mica or titanium dioxide-coated mica pearlescent pigments which have a coating of copper chromite thereon. The coating of copper chromite can either be on the surface of the metal oxide or between the interface of the metal oxide and the mica or other laminar or platy substrate.

DETAILED DESCRIPTION OF THE INVENTION

In accordance with the present invention, a black colored pearlescent pigment is obtained by coating a metal oxide-coated mica pearlescent pigment with copper chromite or coating the mica with copper chromite and then forming the metal oxide layer on top thereof.

Both titanium dioxide-coated mica pearlescent pigments and iron oxide-coated mica pearlescent pigments are well known in the art. They are generally formed by depositing a hydrous titanium or iron compound on the mica substrate followed by hydrolysis and calcining to produce the $TiO_2$- or $Fe_2O_3$-mica pigment. Any of the known metal oxide coated mica pigments can be used in the present invention.

The copper chromite can be deposited on the pearlescent pigment by any convenient procedure. It is preferred to first precipitate chromium onto the surface of the pigment, for example, by contacting the pigment with a chromium chloride solution and maintaining an appropriate pH with a suitable base such as sodium hydroxide, potassium hydroxide or the like. This is followed by the contacting of the pigment with a copper chloride solution and maintaining an appropriate pH with a suitable base such as sodium hydroxide, etc. There is no preference as to which metal is deposited first. The invention is not limited to the use of copper chloride or the above procedure and other appropriate copper materials such as copper nitrate and/or procedures can be used if desired. For instance, after contact with a copper solution at an appropriate pH, chromic acid can be added and the pH adjusted to cause the formation of the copper chromite. Finally, the product can be calcined for about 20 minutes at about 550 to 900° C.

The amount of copper chromite can be varied in order to obtain the desired color and/or opacity. For example, the amount of copper chromite can vary from about 1 to 50%, preferably about 5 to 35%, based on the weight of the pearlescent pigment. As the amount of copper chromite is increased, there is a progression in the interference color and an increase in the opacity of the pearlescent pigment.

The products of the present invention can be used in any application where pearlescent pigments have been used heretofore. Non-limiting examples include various cosmetic formulations, printing inks, colorants for plastic resins, coatings and automotive paints.

Products of this invention have an unlimited use in all types of automotive and industrial paint applications, especially in the organic color coating and inks field where deep color intensity is required. For example, these pigments can be used in mass tone or as styling agents to spray paint all types of automotive and non-automotive vehicles. Similarly, they can be used on all clay/formica/wood/glass/metal/enamel/ceramic and non-porous or porous surfaces. The pigments can be used in powder coating compositions. They can be incorporated into plastic articles geared for the toy industry or the home. These pigments can be impregnated into fibers to impart new and esthetic coloring to clothes and carpeting. They can be used to improve the look of shoes, rubber and vinyl/marble flooring, vinyl siding, and all other vinyl products. In addition, these colors can be used in all types of modeling hobbies.

The above-mentioned compositions in which the compositions of this invention are useful are well known to those of ordinary skill in the art. Examples include printing inks, nail enamels, lacquers, thermoplastic and thermosetting materials, natural resins and synthetic resins. Some non-limiting examples include polystyrene and its mixed polymers, polyolefins, in particular, polyethylene and polypropylene, polyacrylic compounds, polyvinyl compounds, for example polyvinyl chloride and polyvinyl acetate, polyesters and rubber, and also filaments made of viscose and cellulose ethers, cellulose esters, polyamides, polyurethanes, polyesters, for example polyglycol terephthalates, and polyacrylonitrile.

For a well-rounded introduction to a variety of pigment applications, see Temple C. Patton, editor, The Pigment Handbook, volume II, Applications and Markets, John Wiley and Sons, New York (1973). In addition, see for example, with regard to ink: R. H. Leach, editor, The Printing Ink Manual, Fourth Edition, Van Nostrand Reinhold (International) Co. Ltd., London (1988), particularly pages 282–591; with regard to paints: C. H. Hare, Protective Coatings, Technology Publishing Co., Pittsburgh (1994), particularly pages 63–288. The foregoing references are hereby incorporated by reference herein for their teachings of ink, paint and plastic compositions, formulations and vehicles in which the compositions of this invention may be used including amounts of colorants. For example, the pigment may be used at a level of 10 to 15% in an offset lithographic ink, with the remainder being a vehicle containing gelled and ungelled hydrocarbon resins, alkyd resins, wax compounds and aliphatic solvent. The pigment may also be used, for example, at a level of 1 to 10% in an automotive paint formulation along with other pigments which may include titanium dioxide, acrylic lattices, coalescing agents, water or solvents. The pigment may also be used, for example, at a level of 20 to 30% in a plastic color concentrate in polyethylene.

In the cosmetic field, these pigments can be used in the eye area and in all external and rinse-off applications. They are restricted only for the lip area. Thus, they can be used in hair sprays, face powder, leg-makeup, insect repellent lotion, mascara cake/cream, nail enamel, nail enamel remover, perfume lotion, and shampoos of all types (gel or liquid). In addition, they can be used in shaving cream (concentrate for aerosol, brushless, lathering), skin glosser stick, skin makeup, hair groom, eye shadow (liquid, pomade, powder, stick, pressed or cream), eye liner, cologne stick, cologne, cologne emollient, bubble bath, body lotion (moisturizing, cleansing, analgesic, astringent), after shave lotion, after bath milk and sunscreen lotion.

In order to further illustrate the invention, various examples are set forth below. In these examples, as well as throughout this specification and claims, all parts and percentages are by weight and all temperatures are in degrees Centigrade, unless otherwise indicated.

EXAMPLES 1–7

Seven different titanium dioxide-coated mica pearlescent pigments whose particle size varied from 4 to 100 microns were employed. For each pigment, 180 parts were slurried in 2,000 parts of water with stirring. A 23.1% aqueous solution of $CuCl_2.2H_2O$ was added at a rate of 1 ml/min. while maintaining the pH at 5.5 with 10% KOH. The resulting pigment was filtered from the slurry and washed with water. The presscake was then reslurried in an additional 2,000 parts of water and 13.5 parts of chromic acid was added and allowed to dissolve. Then the pH was raised to 7.3 with ammonium hydroxide. The resulting product was filtered, washed with water and then calcined for 30 minutes at 680° C. The resulting two hundred parts of product contains about 10% copper chromite.

EXAMPLES 8–14

The procedure used in Examples 1–7 were repeated replacing the chromic acid with a solution of chromium chloride. These runs were performed in one step, that is, the filtration and washing prior to the chromium chloride addition-was not done. In particular, 180 parts of a titanium dioxide coated mica pearlescent pigment was slurried in 2000 parts of water with stirring. Added was 183.3 grams of 25% $CrCl_3.6H_2O$ solution at 1.5 ml/min. at while maintaining the pH at 5.5 with 10% NaOH. A solution containing 14.66 grams of copper chloride dihydrate (23.1% solution of copper chloride dihydrate ($CuCl_2.2H_2O$)) was then added to the pearlescent pigment slurry at a rate of 1 ml/min. while maintaining the pH constant in the range of 5.0–9.0 using 10% KOH. Once the addition of the copper chloride dihydrate solution is completed, the product is filtered and washed and calcined at a temperature of 680° C.–890° C. for 30 minutes. The resulting product of 200 parts contains approximately 10% copper chromite.

EXAMPLES 15–21

Seven different titanium dioxide-coated mica pearlescent pigments whose particle size varied from 6 to 50 microns were employed. For each pigment, 160 parts were slurried in 1,500 parts of water with stirring. 366.6 grams of a 25% solution of chromium chloride hexahydrate was added at a rate of 1 ml/min. while maintaining the pH at 5.5 with 10% caustic. Once the $CrCl_3$ solution was added, 129.3 grams of a 22.7% solution of copper chloride dihydrate ($CuCl_2.2H_2O$) was added at a rate of 1 ml/min. while maintaining the pH constant at 5.5 using 10% NaOH. The pH is then slowly raised to pH 7.0 using NaOH. The resulting product is filtered and washed and then calcined at 780° C. for 30 minutes. The resulting product of 200 parts contains approximately 20% copper chromite.

EXAMPLES 22–25

Four different iron oxide-coated mica pearlescent pigments whose particle size varied from 6 to 50 microns were employed. For each pigment, 140 parts were slurried in 200 parts of water with stirring. 549.9 grams of a 25% solution of chromium chloride hexa-hydrate ($CrCl_3.6H_2O$) was added at a rate of 1 ml/min. while maintaining the pH constant at 5.5 using 10% NaOH. Once the CrCl3 solution is added, 194 grams of a 22.7% solution of copper chloride dihydrate ($CuCl_2.2H_2O$) was added at a rate of 1 ml/min. while maintaining the pH constant at 5.5 using 10% NaOH. The pH is then slowly raised to pH 7.0 using NaOH. The resulting product is filtered and washed and then calcined at 780° C. for 30 minutes. The resulting product of 200 parts contains approximately 30% copper chromite.

EXAMPLES 26–27

Two different pearlescent pigments of mica coated with varying ratios of titanium dioxide/iron oxide whose particle size varied from 6 to 50 microns were employed. The pigments were coated with copper chromite, and then a layer of metal oxide was applied on the top. This was done by adding 14.66 grams of $CuCl_2.2H_2O$ ($CrCl_3.6H_2O$) to the pigment slurry at a rate of 1 ml/min. while maintaining the pH constant at 5.5 using 10% NaOH. Once the $CrCl_3$ solution is added, filtered and washed and then calcined at 780° C. for 30 minutes. The resulting product of 200 parts contains approximately 30% copper chromite.

EXAMPLE 28

The procedure of Example 1 was repeated except that an iron oxide-coated mica pearlescent pigment was substituted for the titanium dioxide coated mica pigment.

EXAMPLE 29

The pigment of this invention can be formulated into a powder eye shadow by thoroughly blending and dispersing the following materials:

| Ingredients | wt parts |
| --- | --- |
| Mearltalc TCA ® (Talc) | 18 |
| Mearlmica ® SVA (Mica) | 20 |
| Magnesium Myristate | 5 |
| Silica | 2 |
| Cloisonné ® Red 424C (red TiO2-coated mica) | 20 |
| Cloisonné ® Violet 525C (violet TiO2-coated mica) | 13 |
| Cloisonné ® Nu-Antique Blue 626CB (TiO2-coated mica/iron oxide-coated mica) | 2 |
| Cloisonne ® Cerise Flambe 550Z (iron oxide-coated mica) | 2 |
| Preservatives & Antioxidant | q.s. |

Then 7 parts of octyl palmitate and 1 part of isostearyl neopentanoate are heated and mixed until uniform, at which time the resulting mixture is sprayed into the dispersion and the blending continued. The blended material is pulverized and then 5 parts of Cloisonne Red 424C and 5 parts of the pigment of this invention added and mixed until a uniform powder eye shadow is obtained.

EXAMPLE 30

The pigment can be formulated into a lipstick by placing the following amounts of the listed ingredients into a heated vessel and raising the temperature to 85±3° C.:

| Ingredients | wt parts |
| --- | --- |
| Candelilla Wax | 2.75 |
| Carnauba Wax | 1.25 |
| Beeswax | 1.00 |
| Ceresine Wax | 5.90 |
| Ozokerite Wax | 6.75 |
| Microcrystalline Wax | 1.40 |
| Oleyl Alcohol | 3.00 |
| Isostearyl Palmitate | 7.50 |
| Isostearyl Isostearate | 5.00 |
| Caprylic/Capric Triglyceride | 5.00 |
| Bis-Diglycerylpolyalcohol Adipate | 2.00 |
| Acetylated Lanolin Alcohol | 2.50 |
| Sorbitan Tristearate | 2.00 |
| Aloe Vera | 1.00 |
| Castor Oil | 37.50 |
| Red 6 Lake | 0.25 |
| Tocopheryl Acetate | 0.20 |
| Phenoxyethanol, Isopropylparaben, and butylparaben | 1.00 |
| Antioxidant | q.s. |

A mixture of 13 parts of the pigment of this invention and 1 part of kaolin are added and mixed until all of the pigment is well dispersed. Fragrance is added as desired and mixed with stirring. The resulting mixture is poured into molds at 75±5° C., allowed to cool and flamed into lipsticks.

Various changes and modifications can be made in the present invention without departing from the spirit and scope thereof. The various embodiments which were illustrated herein were set forth in order to illustrate the invention but were not intended to limit it.

What is claimed is:

1. A metal oxide-coated mica pearlescent pigment having a coating of copper chromite thereon or therein.

2. The pigment of claim 1 in which the copper chromite coating is about 5 to 30 wt. % based on the metal oxide-coated mica pearlescent pigment.

3. The pearlescent pigment of claim 2 in which the metal oxide is titanium dioxide.

4. The pearlescent pigment of claim 2 in which the metal oxide is iron oxide.

5. The pearlescent pigment of claim 1 in which the metal oxide is titanium dioxide.

6. The pearlescent pigment of claim 1 in which the metal oxide is iron oxide.

7. The pearlescent pigment of claim 1 in which the copper chromite has an interference thickness.

8. The pearlescent pigment of claim 1 in which the copper chromite coating is on the metal oxide.

9. In a colored article comprising a mass of material and a colorant, the improvement wherein the colorant is the pearlescent pigment of claim 8.

10. In a colored article comprising a mass of material and a colorant, the improvement wherein the colorant is the pearlescent pigment of claim 7.

11. In a colored article comprising a mass of material and a colorant, the improvement wherein the colorant is the pearlescent pigment of claim 6.

12. In a colored article comprising a mass of material and a colorant, the improvement wherein the colorant is the pearlescent pigment of claim 5.

13. In a colored article comprising a mass of material and a colorant, the improvement wherein the colorant is the pearlescent pigment of claim 4.

14. In a colored article comprising a mass of material and a colorant, the improvement wherein the colorant is the pearlescent pigment of claim 3.

15. In a colored article comprising a mass of material and a colorant, the improvement wherein the colorant is the pearlescent pigment of claim 2.

16. In a colored article comprising a mass of material and a colorant, the improvement wherein the colorant is the pearlescent pigment of claim 1.

17. In a coating composition including a pigment, the improvement which comprises said pigment being the pearlescent pigment of claim 1.

18. In a plastic composition including a pigment, the improvement which comprises said pigment being the pearlescent pigment of claim 1.

19. In a cosmetic composition including a pigment, the improvement which comprises said pigment being the pearlescent pigment of claim 1.

\* \* \* \* \*